United States Patent [19]

Uphaus

[11] Patent Number: 5,246,403
[45] Date of Patent: Sep. 21, 1993

[54] PIVOTING BELT TENSIONING DEVICE

[75] Inventor: Roderic N. Uphaus, Richmond, Ind.

[73] Assignee: Hoffco, Inc., Richmond, Ind.

[21] Appl. No.: 787,681

[22] Filed: Nov. 4, 1991

[51] Int. Cl.⁵ .............................................. F16H 9/00
[52] U.S. Cl. ...................................... 474/83; 474/117
[58] Field of Search ............... 474/117, 27, 29, 32–35, 474/83, 84, 89; 318/7

[56] References Cited

U.S. PATENT DOCUMENTS

| | | | |
|---|---|---|---|
| 1,501,705 | 7/1924 | Decoux | 474/46 |
| 2,134,159 | 10/1938 | Von Hofe | 474/46 |
| 2,491,248 | 12/1949 | Carroll | 474/46 |
| 2,740,246 | 4/1956 | Smith et al. | 474/45 |
| 2,824,457 | 2/1958 | Norton | 474/46 |
| 2,995,295 | 8/1961 | Day | 474/46 |
| 3,015,237 | 1/1962 | Musgrave | 474/46 |
| 3,498,401 | 3/1970 | Hennen | 474/35 X |
| 3,583,251 | 6/1971 | Peterson | 474/27 |
| 3,824,864 | 7/1974 | Muller | 474/3B X |
| 4,094,204 | 6/1978 | Yamamoto et al. | |
| 4,099,737 | 7/1978 | Waugh | 474/46 |
| 4,117,652 | 10/1978 | Jones et al. | 56/11.8 |
| 4,364,735 | 12/1982 | Plamper et al. | 474/46 |
| 4,768,997 | 9/1988 | Page et al. | 474/27 X |

Primary Examiner—Ramon S. Britts
Assistant Examiner—Roger J. Schoeppel
Attorney, Agent, or Firm—Barnes & Thornburg

[57] ABSTRACT

A belt tensioning assembly that simultaneously controls belt tension and belt drive speed is provided. A pivotable bracket is pivotably attached to a lawn mower or other light duty, belt driven equipment. A variable speed pulley for holding a pair of rotatable belts is attached to a slide bracket and the slide bracket is slidably attached to the pivotable bracket. A spring or other biasing mechanism can be used to connect the slide bracket to the pivotable bracket to maintain substantially constant belt tension.

29 Claims, 3 Drawing Sheets

PIVOTING BELT TENSIONING DEVICE

BACKGROUND AND SUMMARY OF THE INVENTION

The present invention relates to belt drive systems and, particularly to a belt tensioning device for use in a belt drive system. More particularly, the present invention relates to a pivoting belt tensioning device for use in a variable speed drive of the type used in self-propelled lawn mowers.

Belts are often used to transmit power between motors and driven machinery. V-belts are used in many household, automotive and industrial applications as a power transmission element. For example, a belt can be used to transmit power from a motor to a drive mechanism of a light duty self-propelled lawn mower. Typically, a power transmission belt is wrapped around a driver pulley and a driven pulley.

Belt mediated transfer of engine power to drive mechanisms typically requires an apparatus for maintaining tension on the belts. Traditionally, belts are prevented from dislocation or slippage from a belt sheave by belt idler pulleys. In such conventional devices, an idler pulley may be positioned to contact a rotating belt. The idler pulley is spring loaded traverse to the rotating belt to increase the tension on the belt and prevent the belt from slipping or being thrown off a belt wheel. Unfortunately, this type of traditional idler pulley system is permanently mounted relative to the belt, and its location cannot be varied to allow for speed adjustment.

According to the present invention, a pivoting belt tensioning device includes a pivoting bracket, a slide member connected to the bracket to slide between retracted and projected positions, and a variable speed drive pulley mounted on the slide member to move therewith. The drive pulley is configured to receive a power transmission belt coupled to a drive motor and a drive belt coupled to a driven pulley or the like.

In preferred embodiments, a spring is coupled to the pivoting bracket and the slide member to maintain a proper tension on the two belts coupled to the variable speed drive pulley. The pivoting belt tensioning device is pivotable about the pivot point established by the pivoting bracket between a normal "low speed" position wherein the slide member is projected away from the pivoting bracket and various "high speed" positions where the slide member is retracted toward the pivoting bracket. A bowden wire and mechanism (or the like) attached to the slide member is used to pivot the tensioning device to a high speed position by causing the slide member to move relative to the pivoting bracket toward a retracted position as the bracket pivots. During such sliding and pivoting movement, the spring acts to maintain proper tension on both belts coupled to the variable speed drive pulley mounted on the slide member. The power transmission belt acts normally to move the slide member to its projected position and pivot the tensioning device to its normal low speed position.

The present invention provides a belt tensioning assembly that both tensions a belt and allows easy adjustment of belt sheave distance. The belt tensioning assembly is mounted on a base such as a deck of a light duty self-propelled lawn mower. The assembly includes a bracket pivotably attached to the base and a belt sheave such as a variable speed drive pulley for holding a pair of rotatable belts. Typically, one of the pair of rotatable belts is a power transmission belt that is connected between a drive pulley of a power source (such as an internal combustion engine) and the belt sheave. The other belt is a drive belt that is connected between the belt sheave and a driven pulley included in a drive box for driving wheels of a lawn mower.

A slide bracket is slidably attached to the pivotable bracket and the belt sheave is attached to the slide bracket. Movement of the slide bracket relative to the pivotable bracket is regulated in part, by a spring biasably attached between the slide bracket and the pivotable bracket. The slide bracket is retained in sliding relationship to the bracket by retaining means that includes a ledge positioned in spaced apart parallel relationship to a retainer. The ledge and the retainer define therebetween a slide channel dimensioned to accommodate the slide bracket for sliding movement relative to the pivotable bracket. Optionally, to reduce manufacturing costs, the ledge and the retainer are formed from an integral piece of sheet metal folded to define the slide channel.

An aperture is formed in the pivotable bracket to allow pivotal mounting of the pivotable bracket relative to the base. A pivot mounting stud dimensioned to extend through the aperture is formed to include a head dimensioned to engage the pivotable bracket. A cylindrical shaft is attached to the head and dimensioned to pass through the aperture to allow pivotal motion of the pivotable bracket relative to the base. The pivot mounting stud is formed to include a threaded shaft that extends through an aperture in the base and is attachable to the base with a nut.

The belt sheave is a variable speed drive pulley that includes a center wheel mounted for movement between a pair of side wheels to define a first and second beltways respectively between the movable center wheel and each of the pair of side wheels. The movable center wheel is mounted to rotate on a shaft fixedly attached between first and second slide bracket arms mounted on the slide bracket. Limited longitudinal movement along the shaft is allowed in response to pivotal movement of the bracket.

In preferred embodiments, the component parts of the belt tension assembly are configured to interlock into an operational form without requiring fasteners, welds, glues, or other attachment devices. Replacing belts is quick and simple, only requiring an operator to extend the shelf bracket arm until the bracket arms slip out of the slide channel. Each component is inexpensively constructed from one stamped or formed piece of metal, and only a single pivot bolt is required to attach the assembly to a deck of a lawn mower. Advantageously, the entire tensioning device is compact and easy to service.

Additional objects, features, and advantages of the invention will become apparent to those skilled in the art upon consideration of the following detailed description of preferred embodiments exemplifying the best mode of carrying out the invention as present perceived.

BRIEF DESCRIPTION OF THE DRAWINGS

The detailed description particularly refers to the accompanying figures in which.

DETAILED DESCRIPTION OF THE DRAWINGS

Figure 1:
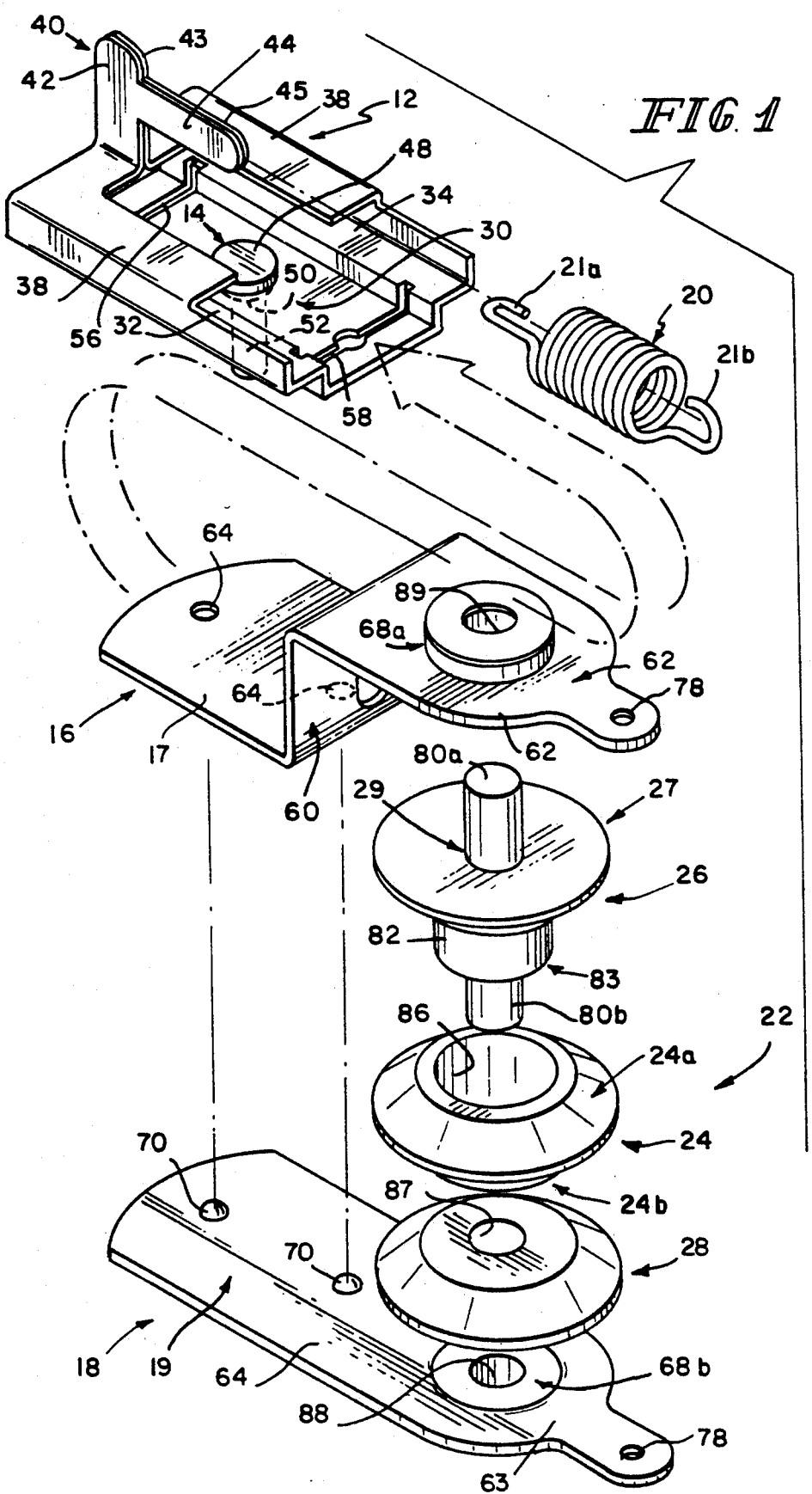
FIG. 1 is an exploded perspective view of belt tensioning apparatus, illustrating at top a pivotable mounting bracket formed to include a slide channel and a tension spring and at the bottom a slide bracket configured to carry a variable speed drive pulley including two side wheels and one center wheel and to slide in the slide channel formed in the mounting bracket.

As shown in FIGS. 1-4, a belt tensioning apparatus 10 is formed by assembly of a pivotable mounting bracket 12, first and second slide bracket arms 16 and 18, tension spring 20, and belt sheave 22 (a variable speed drive pulley). The pivotable mounting bracket 12 is mounted to a base 11 with the aid of a pivot mounting stud 14. Although the base 11 indicated in the drawings forms a part of a self propelled, walk behind lawn mower (not shown), the apparatus 10 is not limited to use with lawn mowers. A device in accordance with the present invention can be attached to a wide variety of other light duty, belt driven machinery requiring constant tensioning action and speed or power control.

Figure 4:
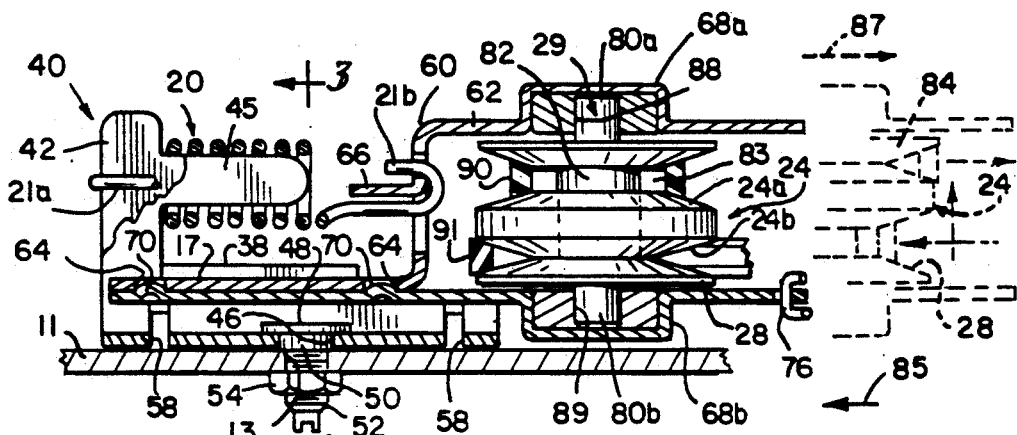
FIG. 4 is a side elevation view of the belt tensioning apparatus shown in FIG. 2, with the variation in position of the belt sheave relative to the pivotable mounting bracket, as well as longitudinal projecting movement of a movable wheel in the belt sheave being indicated by the dotted outline as the belt tensioning apparatus is moved between its first high speed position and its second low speed position relative to the drive box wheel.
Figure 2:
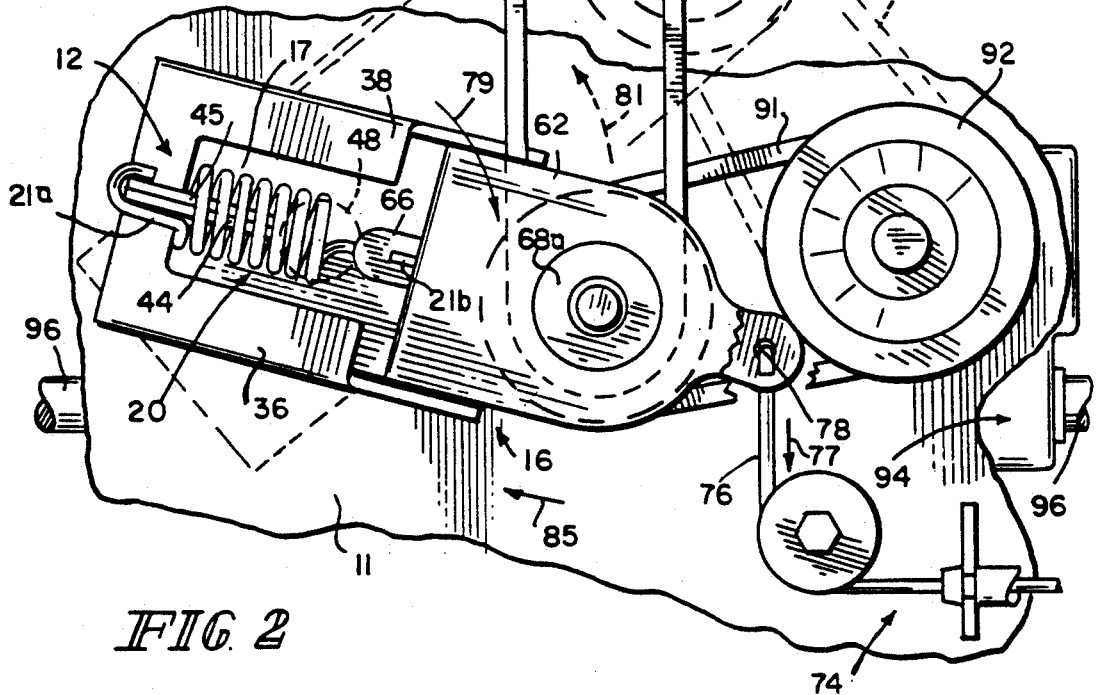
FIG. 2 is a top plan view showing an assembled belt tensioning apparatus pivotably attached to a base on a deck of a lawn mower, with a control cable assembly attached to the slide member to control pivoting movement of the belt tensioning apparatus relative to a drive box wheel to a first "high speed" position (shown in solid outline) from a second "low speed" position (shown in dotted outline)

V-shaped belts such as belts 90 and 91 shown in FIGS. 2 and 4 are used to transmit power from one shaft to another parallel shaft. The power transmitted by a belt drive is a function of belt tension and belt speed. In some applications, such as the embodiment shown in the drawings, it is desirable to provide a motor drive system which includes a drive motor (not shown) for rotating a motor pulley (not shown), a driven pulley 92 coupled to rotate an output device such as an axle of a lawn mower, and a belt drive system having, for example, two belts 90 and 91 for rotating the driven pulley 92 in response to rotation of the motor pulley to cause the drive motor to turn the axle to rotate the wheels attached to the axle and propel the lawn mower. Advantageously, belt tensioning apparatus 10 is configured to maintain proper tension on both of the drive belts 90 and 91 as the belt tensioning apparatus 10 is pivoted. The belt sheave/variable speed pulley 22 included in belt tensioning apparatus 10 can be operated to vary the speed of driven pulley 92 without changing the speed of the motor pulley (not shown).

Figure 3:
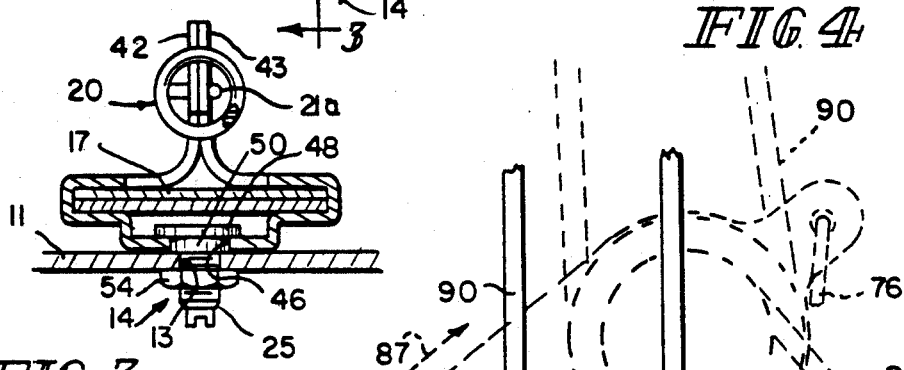
FIG. 3 is a cross sectional view taken along line 3—3 of FIG. 4, showing the attachment of a pivotable mounting bracket to a base by a pivot mounting stud.

In the embodiment shown in FIGS. 2-4, V-belt 90 is coupled to a motor pulley (not shown) that is turned by a drive motor (not shown) and to a top part of the belt sheave/variable speed pulley 22. V-belt 91 is coupled to a bottom part of the variable speed pulley 22 and to a driven pulley 92. The V-belt 90 is sized and configured so that it normally pivots the pivotable belt tensioning apparatus 10 to the position shown in dotted lines in FIG. 2 as the motor pulley is turned by the drive motor to drive V-belt 90. To turn the driven pulley 92 at a faster speed, a control cable 76 or other actuator is pulled in direction 77 to pivot the belt tensioning apparatus 10 to the position shown in solid lines in FIG. 2. This action stretches the V-belt 90 and relaxes the V-belt 91, as a result of the movement of belts 90, 91 on the variable speed pulley 22 and causes belt 91 and the driven pulley 92 to turn at a faster speed.

Referring to FIG. 1, the pivotable mounting bracket 12 may be formed from a single piece of stamp-formed sheet metal as shown. The pivotable mounting bracket 12 is folded to form a central depressed area or plate 30, spaced apart first and second horizontal side ledges 32 and 34 on opposite sides of plate 30, spaced apart first and second side retainers 36 and 38, and a spring holder 40. The spring holder 40 is formed from projections 42 and 43 that are brought together and joined into a single extending piece. Arranged to extend perpendicular to projections 42 and 43 are projections 44 and 45. Projections 44 and 45 are also joined together to give a supporting projection over which spring 20 can be fitted. With this arrangement, the first and second side ledges 32, 34 and first and second side retainers 36, 38 cooperate to define a slide channel 35 for slidably receiving slide member 16, 18.

The pivotable mounting bracket 12 is also formed to define apertures for mounting or control of apparatus 10. A mounting aperture 46 is formed as shown in FIG. 4 to extend through the center of plate 30. The pivot mounting stud 14 is positioned to extend through the plate 30 and an aperture 13 is formed in the base 11, allowing pivotable connection of the pivotable mounting bracket 12 to the base 11. The pivot mounting stud 14 is formed to have a head 48, a cylindrical shank 50, and a smaller dimensioned threaded shank 52. A nut 54 is threaded onto the threaded shank 52 to fixedly attach the pivot mounting stud 14 relative to the base 11.

Although in this illustrated embodiment the pivotable mounting bracket 12 is formed from a single sheet of stamped steel, alternative construction from multiple pieces that are welded, mechanically joined by screws, bolts, or rivets, adhesively attached by epoxies or other conventional adhesives, or otherwise attached to each other is contemplated. In addition, other materials may be used, including non-ferrous metals, molded engineering grade plastics, or other rigid, durable materials known in the art.

In operation, the pivotable mounting bracket 12 is free to rotate in the plane of the plate 30 about the cylindrical shaft 50 that extends through mounting aperture 46 defined in the plate 30. Engagement of the head 48 of the pivot mounting stud 14 and plate 30 prevents movement of the pivotable mounting bracket 12 away from the base 11.

In addition to the mounting aperture 46, control apertures or slots 56 and 58 are also defined in the plate 30 as shown in FIGS. 1 and 4. These apertures 56, 58 are provided to allow optional attachment of control cables (not shown) to restrict or otherwise control or limit the rotational movement of the pivotable mounting bracket 12. In operation, a control cable having an enlarged terminating head (not shown) would be inserted through one of the apertures 56, 58. Modifying the length of the cable relative to the base 11 by extension or retraction of the cable 76 controls the position of the apparatus 10.

The first and second slide bracket arms 16, 18 are connected to one another to form a slide member that slides in the slide channel 35 formed in pivotable mounting bracket 12 between a normal projected position (shown in dotted lines in FIGS. 2 and 4) and a retracted position (shown in solid lines in FIGS. 2 and 4). Like the pivotable mounting bracket 12, the first and second slide bracket arms 16 and 18 may each be formed from a single piece of stamp formed sheet metal. The first slide bracket arm 16 is folded to have a "chair-like" configuration as shown best in FIGS. 1 and 4. The "back" of chair is formed by a horizontally extending slide plate 17, the "seat" of the chair is formed by a plate 60 extending at 90° dihedral angle relative to the plate 60, and the "leg" of the chair is formed by a first bearing plate 62, extending at a 90° dihedral angle relative to the plate 60 and in spaced apart parallel relationship to the slide plate 17. To aid in its attachment and positioning, the slide plate 17 is formed to include a pair of apertures 64 therethrough as shown in FIG. 1. The plate 60 is stamp formed and folded as shown best in FIGS. 2 and 4 to form a rearwardly extending flange 66 around which the front end 21b of tension spring 20 is engaged, and the first bearing plate 62 is stamped to define a raised circular bearing 68a configured to support the variable speed pulley 22.

The second slide bracket arm 18 is substantially flat throughout as shown in FIG. 1 and 4, but includes a slide plate 19 integral and contiguous with a second bearing plate 64. The slide plate 19 is provided with a pair of protrusions 70 positioned and dimensioned to fit into apertures 64 defined through the slide plate 17 as shown best in FIGS. 1 and 4. The second bearing plate 64 is also stamped to define a raised bearing 68b that substantially corresponds in form and arrangement to bearing 68a but projects in an opposite direction.

As will be appreciated by those skilled in the art, the first and second slide bracket arms 16 and 18 may be integrally formed. In addition, both slide bracket arms may be formed to have a "chair" type configuration. Alternatively, other slide bracket configurations suitable for holding a belt sheave may be used.

When the belt tensioning apparatus 10 is fully assembled, the first and second slide bracket arms 16 and 18 are held together by engagement between the protrusions 70 and apertures 64. The protrusions 70 are prevented from slipping out of the apertures 64 by the close fitting of the slide plates 17 and 19 into a slide channel 35 of the pivotable mounting bracket 12. The slide channel 35 is defined between the first and second side ledges 32, 34 and the first and second side retainers 36, 38 of the pivotable mounting bracket 12. As best seen in FIGS. 2 and 3, only horizontally directed, reciprocable motion of the first and second slide bracket arms 16, 18 within the slide channel 35 and relative to the pivotable mounting bracket 12 is allowed.

The spring 20, connected to the flange 66 on the first slide bracket arm 16 and to the spring holder 40 on the pivotable mounting bracket 12, prevents complete withdrawal of the first and second slide bracket arms 16 and 18 from the slide channel 35 defined by the pivotable mounting bracket 12. However, the spring 20 acts as a tether to permit reciprocating sliding movement of the slide bracket assembly 16, 18 in the slide channel between the projected position of the slide bracket shown in dotted lines in FIGS. 2 and 4 and a retracted position shown in solid lines in FIGS. 2 and 4. In the embodiment of the invention illustrated in FIGS. 1-4, the spring 20 is provided with end hooks 21a and 21b that respectively engage about the flange 66 of the first slide bracket arm 16 and the spring holder 40 of the pivotable mounting bracket 12 (best seen in FIG. 4).

In the embodiments of FIGS. 1-4 and 6, the spring 20 is a tension spring biased to oppose forces generated by belts 90 and 91 that tend to pull the first and second slide bracket arms 16, 18 away from the pivotable mounting bracket 12. As best seen in FIG. 2, control cable assembly 74 provides a force that opposes the spring 20 and is capable of acting to pull the slide bracket arms 16 and 18 relative to the pivotable mounting bracket 12 to a retracted position shown in solid lines in FIGS. 2 and 4. Control cable 76 is a bowden wire that is attached to an aperture 78 defined in the first slide bracket arm 16. Retraction of the control cable 76 in direction 77 pivots the belt tensioning apparatus 10 in direction 79 from a first position shown in dotted lines in FIGS. 2 and 4 to a second position indicated by solid lines in FIGS. 2 and 4. As position of the apparatus 10 changes, the spring 20 automatically adjusts to maintain about a predetermined tension on belts 90 and 91 coupled to the variable speed pulley 22. Advantageously, such tension promotes retention of belts and improves the operation of the variable speed drive system in accordance with the present invention.

The variable speed pulley 22 is mounted for rotation between the first and second slide bracket arms 16 and 18. The variable speed pulley 22 includes a wheel holder 26 having a first side wheel 27 and a shaft 29 that holds a movable center wheel 24 (having identically configured and opposingly directed sides 24a and 24b) and a second side wheel 28. The shaft 29 of wheel holder 26 has ends 80a and 80b respectively held in the apertures 88 and 89 defined in bearings 68a and 68b. A bearing disc 82 is mounted on the shaft 29, and the frustoconical-shaped first side wheel 27 is formed adjacent to the bearing disc 82.

As best shown in FIGS. 1 and 4, when the variable speed pulley 22 is assembled, the movable center wheel 24 is positioned both to rotate about the bearing disc 82 of the wheel holder 26 and to move vertically up and down along the length of bearing disc 82 between the first side wheel 27 and the second side wheel 28. The movable center wheel 24 is held by engagement with face 83 of the outer shaft 82.

In operation, the belt tensioning apparatus 10 is used to vary the turning speed of the driven pulley 92 and control the tension applied to each of the V-belts 90 and 91. As shown in FIG. 2, the belt tensioning apparatus 10 is mounted in close proximity to the driven pulley 92 and thus provides a compact system well suited and readily adaptable for use in a drive system mounted on a light or medium duty apparatus, such as the deck of a lawn mower. As shown in FIG. 2, driven pulley 92 is connected to the rear axle 96 of a lawn mower (or other output shaft) by means of a drive box 94. The rear axle 96 rotates and drives the rear wheels (not shown ) of the self-propelled lawn mower or other self-propelled lawn mower or other self-propelled apparatus.

Initially, the belt tensioning apparatus 10 will be pivoted in direction dotted arrow 81 to the dotted line position shown in FIG. 2 because of forces exerted on apparatus 10 by drive belt 90. In this position, the slide member 16, 18 carrying the variable speed pulley 22 is moved in direction 87 away from the pivotable mounting bracket 12 to a projected position. At the same time, tension spring 20, selected to have an appropriate spring constant, applies a restraining force to the projected slide member 16, 18. This restraining force tends to bias the slide member 16, 18 toward its retracted position and maintain a preselected tension on each of the belts 90 and 91, reducing the possibility of belt disengagement and enhancing operation of the belt drive system. This force acts through the axis of rotation of the variable speed pulley 22. In this normal position, the driven pulley 92 (and therefore the rear axle 96 of the lawn mower) is being turned at a relatively slow speed. It will be understood that the center and side wheels 24, 27, 28 included in the variable speed pulley 22, self-adjust by up or down movement of the movable center wheel 24 to control the speed of the belts 90, 91.

The control wire 76 is moved in direction 77 using actuator 74 to pivot the belt tensioning apparatus 10 against the bias provided by V-belt 90 to the position shown in solid lines in FIG. 2. In this position, the driven pulley 92 (and therefore the rear axle 96 of the lawn mower) is turned at a relatively faster speed because of the operation of the variable speed pulley 22. In this position, the slide member 16, 18 carrying the variable speed pulley 22 is moved in direction 85 toward the pivotable mounting bracket 12 to a retracted position. At the same time, tension spring 20 continues to apply a restraining force to the projected slide member 16, 18. This restraining force continues to tend to bias the slide member 16, 18 toward its retracted position and maintain a preselected tension on each of belts 90 and 91. This tension helps to enhance operation of the belt drive system as it is operated at a higher speed output condition.

To resume slower output speed operation, the actuator 74 is operated to release control cable 76 so that the belt tensioning apparatus 10 can be pivoted back to the dotted line position shown in FIG. 2 under the urging provided by the V-belt 90. Advantageously, the slide action in belt tensioning apparatus 10 allows the apparatus 10 to expand and contract as needed and the biasing force provided by tension spring 20 maintains proper tension on belts 90 and 91 regardless of the speed of the belt drive system. It will be understood that the movable center wheel 24 included in the variable speed pulley 22 moves up and down as required to control the turning speed of belt 91 (and thereby driven pulley 92) during pivoting movement of belt tension apparatus 10 in directions 79 and 81.

Another advantageous feature of the belt tensioning apparatus 10 is its ease of assembly and disassembly. To assemble the belt tensioning apparatus 10, an operator simply spatially orders components of the apparatus 10 as shown in FIG. 1. The variable speed pulley 22 is assembled first, with the movable center wheel 24 being fitted over the face 83 of the bearing disk 82 on the wheel holder 26 so that a frustoconically shaped first side 24a is opposed to the similarly shaped first side wheel 27. The second side wheel 28 is then fitted over the shaft 29 of the wheel holder 26 so that the frustoconically shaped side 24b opposes the second side wheel 28. These assembled components are positioned between the first and second slide bracket arms 16 and 18. The end 80a of the shaft 29 are fitted into aperture 89 formed in bearing 68a, which is stamped formed into the first bearing plate 62 of the first slide bracket arm 16. Then, while orienting the second bracket arm 18 relative to the first bracket arm 16 so that apertures 64 will mate with protrusions 70, the end 80b of the shaft 29 is fitted into aperture 88 defined by bearing 68b. Like its corresponding bearing 68a, the bearing 68b may be stamp formed into the second bearing plate 63 of the second bracket arm 18.

To prevent disengagement of the first slide bracket arm 16 from its opposing second slide bracket arm 18, the assembled slide plates 17 and 19 of the first and second slide bracket arms 16 and 18 are slipped into the slide channel 35 defined in the pivotable mounting bracket 12. Interaction of the slide plates 17 and 19 with the first and second side ledges 32 and 34 and the first and second side retainers 36 and 38 prevents dissociation of the first and second slide bracket arms 16 and 18 from each other, and consequent release of the variable speed pulley 22.

Assembly of the belt tensioning apparatus 10 is completed by connecting spring hook 21a of tension spring 20 to the upstanding spring holder 40 and attaching the spring hook 21b of spring 20 to flange 66. The tension spring 20 is biased to oppose forces generated by belts 90 and 91 that act to pull the slide plates 17 and 19 of the slide bracket arms 16 and 18 out of the slide channel 35 defined in the pivotable mounting bracket 12 toward the projected position. The belt tensioning apparatus 10 is pivotably attached to the base 11 with the pivot mounting stud 14 as previously described to allow pivotal movement. Except for the attachment of mounting bracket 12 to the base 11, no fasteners or tools are required to assemble or disassemble the belt tensioning apparatus 10.

Figure 5:
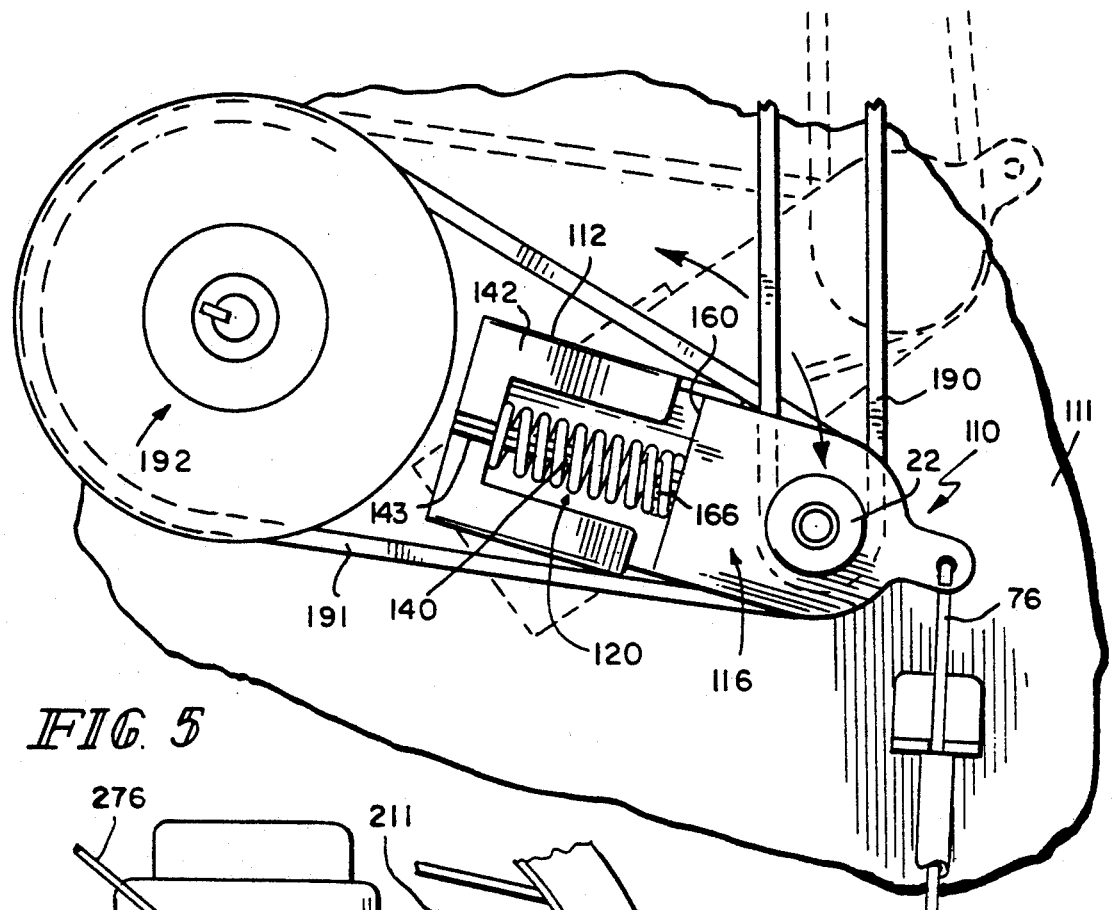
FIG. 5 is a top plan view illustrating an alternative embodiment of a belt tensioning apparatus in which a compression spring is used to bias a sliding connection between pivotable mounting bracket and bracket arms carrying a rotatable belt sheave.

In alternative embodiments of the invention, tensioning of belts and power control can be accomplished with a compression spring rather than a tension spring. In the embodiment of the invention illustrated as FIG. 5, a belt tensioning apparatus 110 is horizontally, pivotally mounted to a base 111 of a lawn mower (not shown). The apparatus 110 mediates transfer of power between a power source (not shown) connected by way of belt 190, and a drive box wheel 192 connected to the apparatus 110 by way of belt 191. Construction and operation of the belt tensioning apparatus 110 is substantially identical to that of apparatus 10 illustrated in FIGS. 1–4, with the exception of the replacement of the tension spring 20 by a compression spring 120. The compression spring 120 is supported between a flange 166 and a spring holder 140, and acts to push on a plate 160 of a first bracket arm 116 and projections 142, 143 of a pivotable mounting bracket 112. The compression spring 120 acts to apply a force through the axis of rotation of the variable speed pulley 122.

Figure 6:
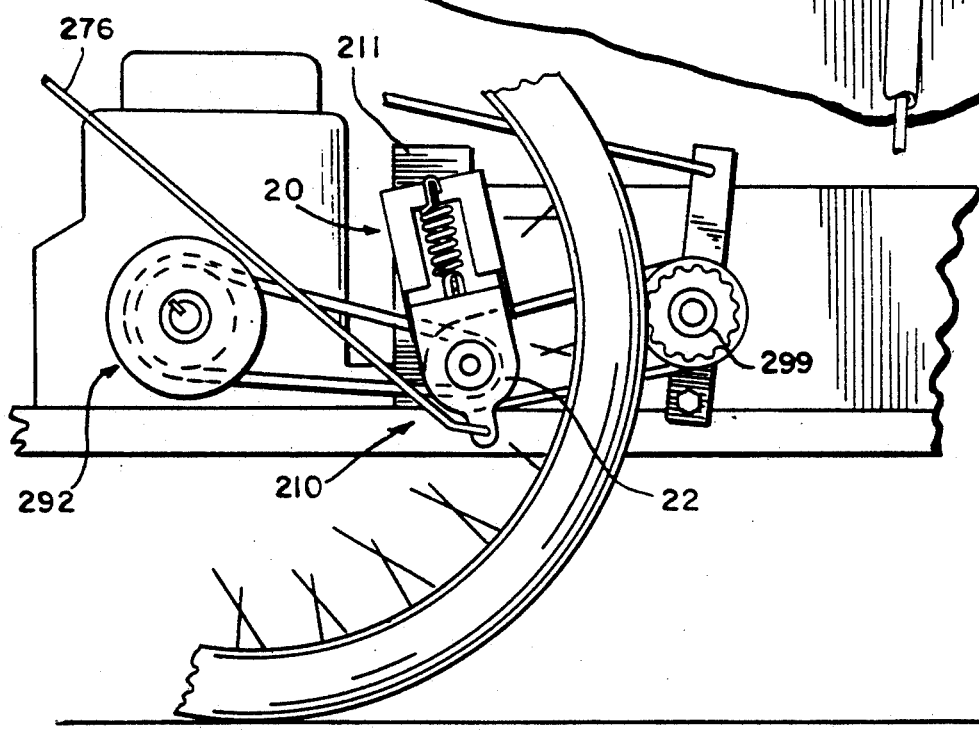
FIG. 6 is a side elevation view of the belt tensioning apparatus of FIGS. 1-4, vertically oriented and mounted to drive rear wheels of a lawn mower.

In another alternative embodiment, a belt tensioning apparatus 210 (substantially corresponding to apparatus 10 described with reference to FIGS. 1–4) can be vertically mounted on a base 211 to allow tensioning of belts and control of power delivered to lawn mower rear wheels. As shown in FIG. 6, the belt tensioning apparatus is mounted between a drive box wheel 292 and a power wheel 99. The position of apparatus 210 is controlled by retraction of a control cable 276.

Although the invention has been described in detail with reference to certain preferred embodiments, variations and modifications exist within the scope and spirit of the invention as described and defined in the following claims.

I claim:

1. A belt tensioning assembly pivotably mountable on a base, the assembly comprising
    a bracket,
    means for pivotably attaching the bracket to the base,
    a variable speed pulley for holding a pair of rotatable belts,
    a slide bracket attached to the bracket and having a longitudinal axis, the variable speed pulley being attached to the slide bracket, and
    means for biasing movement of the slide bracket relative to the bracket, the biasing means being positioned parallel to the longitudinal axis of the slide bracket.

2. The assembly of claim 1, wherein the bracket is formed to define means for slidably retaining the slide bracket.

3. The assembly of claim 2, wherein the retaining means includes a ledge positioned in spaced apart parallel relationship to a retainer, the ledge and the retainer defining therebetween a slide channel dimensioned to accommodate the slide bracket for sliding movement.

4. The assembly of claim 3, wherein the ledge and the retainer are formed from an integral piece of sheet metal folded to define the slide channel.

5. The assembly of claim 1, wherein the attaching means comprises an aperture defined in the bracket and a pivot mounting stud dimensioned to extend through the aperture.

6. The assembly of claim 5, wherein the pivot mounting stud includes a head dimensioned to engage the bracket, a cylindrical shaft attached to the head and dimensioned to pass through the aperture to allow pivotal motion of the bracket relative to the base, and means for attaching the pivot mounting stud to the base.

7. The assembly of claim 6, wherein the means for attaching the pivot mounting stud to the base includes a threaded nut and a threaded shaft, the threaded shaft being configured to extend through a base aperture defined in the base, and the threaded shaft being attachable to the base with the threaded nut.

8. The assembly of claim 7, wherein a ledge and a retainer are positioned in spaced apart parallel relationship to define a slide channel therebetween, a basal channel is defined between the basal plate and a slide channel, and the head of pivot mounting stud projects into the basal channel.

9. The assembly of claim wherein the variable speed pulley includes a movable wheel mounted between a pair of side wheels to define a first and second beltways respectively between the movable wheel and each of the pair of side wheels.

10. The assembly of claim 9, wherein the movable wheel is mounted to revolve about a shaft fixedly attached between first and second slide bracket arms.

11. The assembly of claim 10, wherein the movable wheel is mounted to allow longitudinal movement along the shaft in response to pivotal movement of the bracket.

12. The assembly of claim 11, wherein each of the pair of side wheels is mounted on an inner shaft, and the movable wheel is mounted on an outer shaft concentrically arranged to surround the inner shaft.

13. The assembly of claim 12, wherein the inner shaft is supported between bearings respectively defined in the first and second slide bracket arms.

14. The assembly of claim 1, wherein biasing means includes a spring attached between the slide bracket and the bracket.

15. The assembly of claim 14, wherein the spring is a tension spring biased to pull the slide bracket toward the bracket.

16. The assembly of claim 14, wherein the spring is a compression spring biased to push the slide bracket away from the bracket.

17. A belt tensioning assembly pivotably mountable on a base, the assembly comprising
    a bracket formed to define a slide channel,
    means for pivotably attaching the bracket to the base,
    a slide bracket having a longitudinal axis positionable for sliding movement in the slide channel for sliding movement therein,
    means for mounting the slide bracket in the slide channel for sliding movement therein,
    means for holding belts the holding means being attached to the slide bracket of movement therewith, and
    means positioned along the longitudinal axis of the slide bracket for biasing movement of the slide bracket relative to the bracket.

18. A pivoting belt tensioning device for holding belts coupling a drive pulley and a driven pulley, the device comprising,
    a pivoting bracket,
    a slide member connected to the pivoting bracket to slide between retracted and projected positions, and the slide member having a longitudinal axis
    a variable speed drive pulley mounted on the slide member to move therewith, the variable speed drive pulley being configured to receive a belt coupled to a drive pulley and another belt occupied to a driven pulley, and
    spring means for biasing movement of the slide member relative to the pivoting bracket, the spring means being positioned to extend along the longitudinal axis of the slide member.

19. The apparatus of claim 18, wherein the pivoting belt tensioning device further comprises spring means for biasing movement of the slide member relative to the pivoting bracket.

20. An apparatus for applying tension to a pair of rotating belts included in a variable speed belt drive system, the apparatus comprising
    a platform,
    a slide member having a longitudinal axis and coupled to the platform to slide relative to the platform between retracted and projected positions,
    a spring acting along the longitudinal axis of the slide member and connecting the platform and the slide member and urging the slide member to its retracted position, and
    means for engaging both rotating belts, the engaging means being mounted on the slide member to move therewith and vary the tension applied to both belts during movement of the slide member between its retracted and projected positions.

21. The apparatus of claim 20, wherein the spring is a tension spring.

22. The apparatus of claim 20, wherein the spring is a compression spring.

23. The apparatus of claim 20, further comprising means for pivotably coupling the platform to a base so that the platform pivots relative to the base during movement of the slide member relative to the platform between its retracted and projected positions.

24. The apparatus of claim 22, further comprising means for moving the slide member against biasing forces provided by the spring from its retracted position to its projected position to vary the rotational speed of the rotating belts while maintaining at least a predetermined tension on each of the rotating belts.

25. The apparatus of claim 20, wherein the platform includes a bracket formed to include a slide member-receiving channel and a paring holder an the spring includes a first end coupled to the spring holder and a second end coupled to the slide member.

26. The apparatus of claim 25, wherein the spring is a tension spring.

27. The apparatus of claim 25, wherein the spring is a compression spring.

28. The apparatus of claim 20, wherein the engaging means includes a variable speed pulley and means for supporting the variable speed pulley and means for supporting the variable speed pulley for rotation relative to the slide member about an axis of rotation and the supporting means is coupled to the slide member.

29. The apparatus of claim 28, wherein the supporting means includes a shaft, the variable speed pulley includes a first side wheel fixed to the shaft, a second side wheel fixed to the shaft to lie in spaced-apart relation to the first side wheel, and a movable center wheel positioned between the first and second side wheels and mounted to the shaft to rotate about the shaft and move axially along the shaft between the first and second side wheels, the first side wheel and the movable center wheel cooperate to define means for holding a first of the pair of rotating belts, and the movable center wheel and the second side wheel cooperate to define means for holding a second of the pair of rotating belts.

* * * * *